United States Patent [19]

Drew et al.

[11] Patent Number: 5,133,167
[45] Date of Patent: Jul. 28, 1992

[54] CEILING PANEL

[75] Inventors: Daniel P. Drew; George M. Greenberger, both of Buffalo, N.Y.

[73] Assignee: Water Shield Corporation, Buffalo, N.Y.

[21] Appl. No.: 600,521

[22] Filed: Oct. 19, 1990

[51] Int. Cl.⁵ .............................................. E04B 9/04
[52] U.S. Cl. ........................................... 52/488; 52/484
[58] Field of Search ............... 52/484, 801, 814, 792, 52/488, 534, 558, 559, 554, 533, 169.5, 316, 311

[56]  References Cited

U.S. PATENT DOCUMENTS

| | | |
|---|---|---|
| 562,798 | 6/1896 | Brocker ............................... 52/533 |
| 2,913,571 | 11/1959 | Smith . | |
| 3,074,339 | 1/1963 | Pennati . | |
| 3,606,617 | 9/1971 | Frazier ............................... 52/801 |
| 4,189,888 | 2/1980 | Blitzer, Jr. ......................... 52/484 |
| 4,454,863 | 6/1984 | Brown et al. ...................... 52/533 |
| 4,729,202 | 3/1988 | Ferland ............................. 52/520 |

Primary Examiner—Michael Safavi
Attorney, Agent, or Firm—Bean, Kauffman & Spencer

[57] ABSTRACT

Ceiling panels useful for controlling fluid flow in overhead fluid leaks are disclosed comprising a generally fluid impermeable surface, having a fluid retention zone extending below a fluid collection zone when the panel is arranged in generally horizontal position, with the fluid retention zone containing a fluid outlet. The panel has channels extending from the collection zone to the retention zone, sufficient to direct fluid, flowing by gravity, toward the fluid outlet when the panel is horizontal.

11 Claims, 2 Drawing Sheets

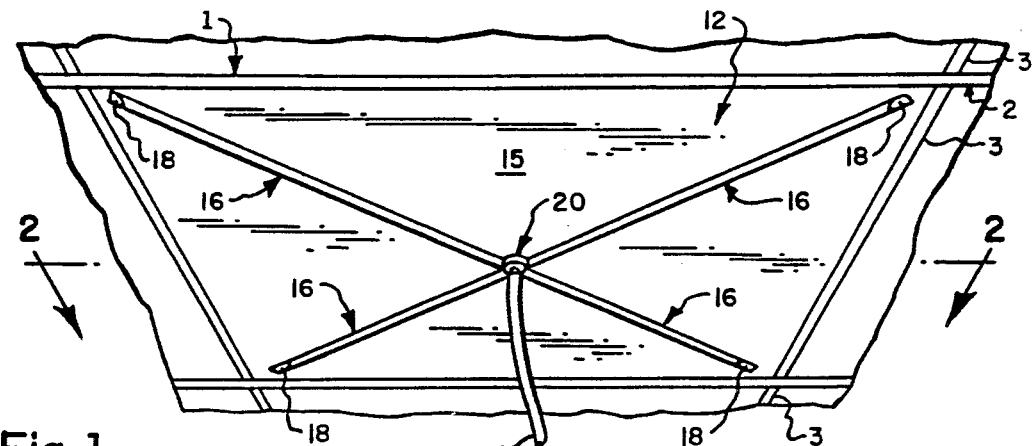
Fig. 1.
Fig. 2.
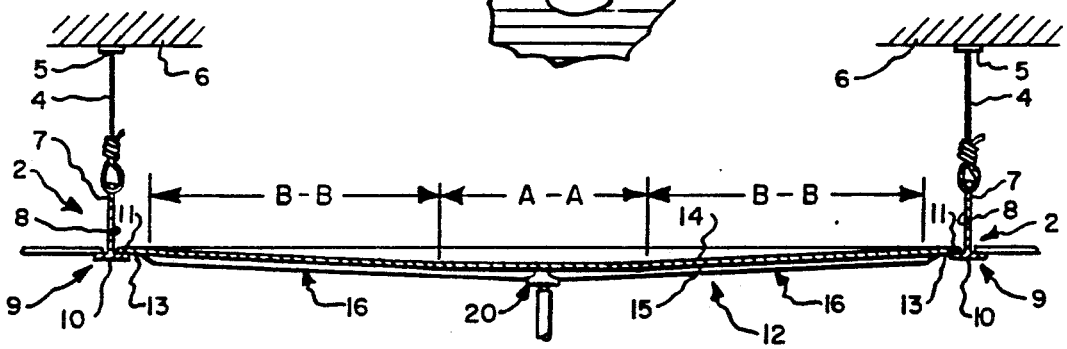
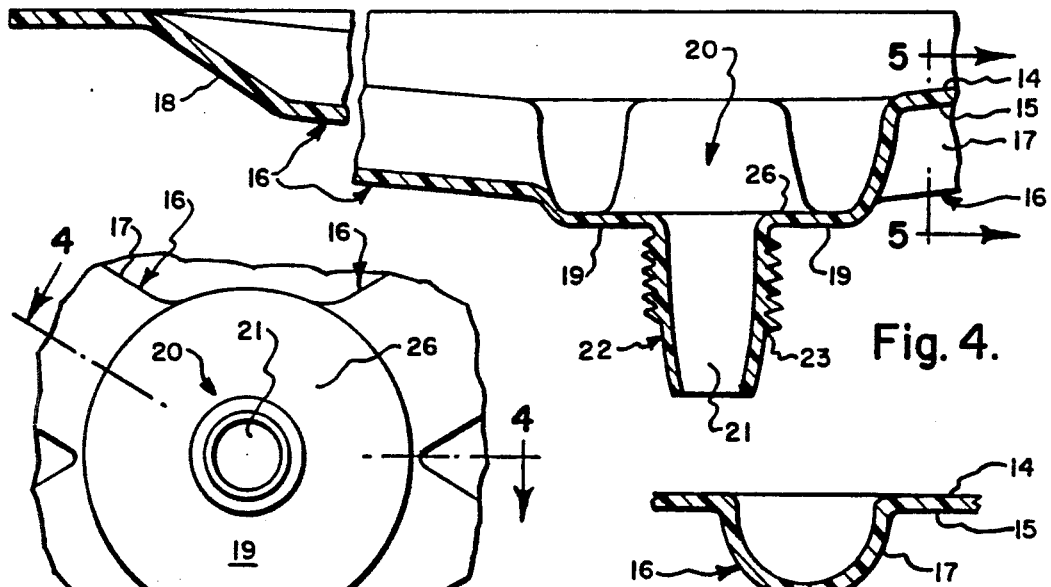
Fig. 3.
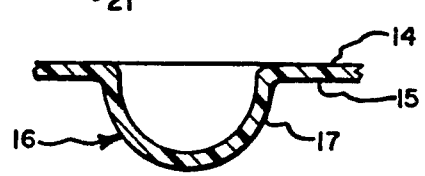
Fig. 4.
Fig. 5.

CEILING PANEL

The present invention relates to ceiling panels and more specifically to ceiling panels of the type that may be suspended, in an arrangement, from an overhead supporting structure.

In building structures having overhead supported, suspended ceiling panels, significant damage can result from fluid leaks that may develop above a ceiling panel arrangement. It is not unusual for a floor or roof above a suspended ceiling to leak, or for an above ceiling pipe, storage container or the like to burst or otherwise leak, resulting in the flow of fluids such as water and the like downwardly to one or more ceiling panels of the suspended ceiling. Typically, ceiling panels are manufactured from compressed fibrous or the like materials and have interstitial spaces for improved sound absorption. Such arrangement of material typically tends to absorb fluids and typically fluid flowing onto ceiling panels manufactured from such materials saturates a first panel which in turn can cause fluid flow to adjacent panels such that several panels can become wetted and stained from a single above-ceiling leak source.

Eventually the fluid can flow through the ceiling panel or panels and drain downwardly to an area under the ceiling. Typically when fluid wets through such ceiling panel, it drains from more than one location on the surface of the panel and may even shift locations depending upon the amount of fluid being drained and the flow patterns that develop within the panel. Because of the inconsistent and multiple locations of fluid drainage the collection of the draining fluid can be problematical and the protection of valuables under the ceiling becomes difficult. It would thus be advantageous to have a means for directing fluid, flowing onto a ceiling panel from an above ceiling leak, to a centralized collection point.

SUMMARY OF THE INVENTION

It is no proposed to resolve various of the problems associated with overhead fluid leakage on conventional suspended ceilings by providing a ceiling panel comprising, a generally fluid impermeable layer; a ceiling support surface for generally horizontal engagement with a ceiling panel support grid; said fluid impermeable layer having fluid collection and fluid retention zones; said fluid collection zone arranged in a plane above said fluid retention zone when said ceiling attachment surface is generally horizontally engaged with said ceiling panel support grid; and, said fluid retention zone comprising a fluid outlet and means to direct fluid, flowing by gravity, toward said fluid outlet.

By generally fluid impermeable layer is meant a layer, coating, surface or the like contained on or within the panel that is generally impermeable to the flow of fluids, particularly liquids, therethrough. The panel may consist essentially of a generally impermeable material, as for example a generally fluid impermeable polymeric sheet, or may comprise both generally permeable and generally impermeable materials in layers.

The generally fluid impermeable layer need not be an exterior surface of the panel, but may be a layer within the panel. Thus such generally fluid impermeable layer may comprise an outer upper surface of the panel, may be sandwiched between fluid permeable layers, or may comprise an inner or outer lower surface of the panel or the like.

A generally fluid impermeable layer can comprise various materials depending upon the fluid that might be expected to be leaked. Thus, the layer can comprise a polymeric, metallic or the like sheet or coating and can have other properties such as flame retardancy and the like. For example the material might be comprised of a polymer, preferably one that is flame retardant, that is generally impermeable to water at pressures up to some minimum depth of fluids held in the retention zone, but not impermeable to high water pressures attributable to higher depths. Likewise the layer can be impermeable to higher pressures and even to fluids such as solvents and the like. Generally layers that comprise materials impermeable to common fluids that are liquid at room temperature, such as water and the like, at fluid depths up to about 4 inches, are preferred.

In a preferred embodiment, a generally rectangular ceiling panel is provided comprising a polymeric fluid impermeable layer, said polymeric layer being a fluid barrier and comprising fluid directing channels extending from the fluid collection zone of the layer to the fluid retention zone thereof, said channels having side walls extending in a plane diverging from the general plane of the layer. In a most preferred embodiment the fluid retention zone is centrally positioned in respect to a rectangular ceiling panel and the fluid outlet is positioned at a lowest point in the fluid retention zone. Four channels are integrally molded into the polymeric fluid impermeable layer and are arranged to extend from about the four corners of the rectangle to a centrally located fluid outlet in the retention zone.

BRIEF DESCRIPTION OF THE DRAWINGS

The nature and mode of operation of the present invention will now be more fully described in the following detailed description taken with the accompanying drawings wherein:

FIG. 1 is a perspective view of an assembled suspended ceiling comprising a ceiling panel of the present invention;

FIG. 2 is a sectional view of the suspended ceiling of FIG. 1 taken along about line 2—2 of FIG. 1;

FIG. 3 is an enlarged fragmentary plan view of the outlet of FIG. 1;

FIG. 4 is an enlarged fragmentary section taken along about line 4—4 of FIG. 3;

FIG. 5 is an enlarged fragmentary section taken along about line 5—5 of FIG. 4;

DETAILED DESCRIPTION

Figure 6:
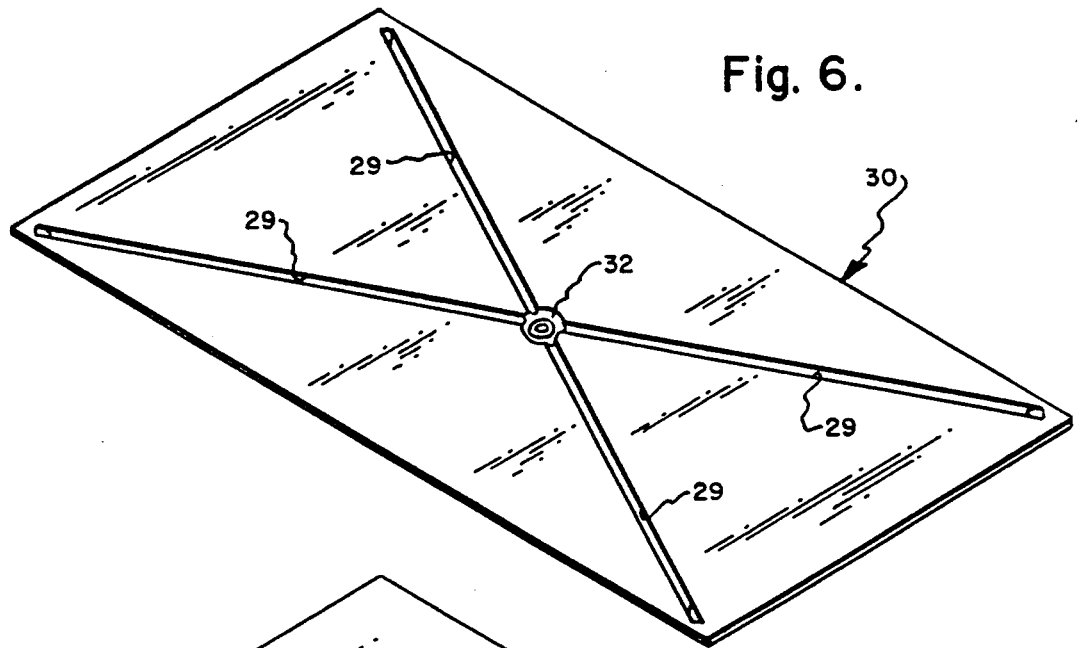
FIG. 6 is a top perspective view of a ceiling panel of the present invention.

It will be understood at the outset that the ceiling panel of the present invention possesses utility in diverse suspended ceiling arrangements. However, in order to facilitate description of the present invention, specific reference will be made to the drawings as follows.

FIGS. 1-5 illustrate a ceiling panel of the invention installed in typical suspended ceiling grid arrangement wherein a ceiling support grid 1, comprising main hanger beams 2 and intermediate hanger beams 3, is suspended by wire supports 4 extending from connector 5 attached to above-ceiling support structures 6 to attachment means on main hanger beams 2. Main and cross hanger beams 2 and 3, respectively, typically are inverted "T" configured with the leg 8 of the main hanger beams comprising attachment holes 7, or the equivalent thereof, through which wire supports 4 can be threaded for twist attachment to provide height adjustment of the hanger relative to the support structures. The head 9 of the hanger beams comprise exterior surface 10 which typically is seen as part of the ornamentation of the ceiling and interior support surfaces 11, which support the ceiling panel at its periphery. Thus, ceiling panel 12 is typically supported in ceiling support grid 1 by placing the ceiling panel into the support grid such that panel support surface 13, about the periphery of the panel, engages interior support surfaces 11 of hanger beams 2 and 3 such that the weight of the panel maintains it in position. It should be understood that clip or other means may be used to hold the panel in place in addition to the weight of the panel.

The ceiling panel illustrated in FIGS. 1-5, comprises a semi-rigid, generally homogeneous, polymeric sheet having an upper fluid impermeable surface 14 and lower panel surface 15. Support surface 13 extends around the perimeter of lower panel surface 15 for engagement with interior support surface 11 of hanger beams 2 and 3. Fluid directing channels 16 are molded into the polymeric sheet and extend from fluid outlet 20 toward the perimeter of the panel. Channel 16 is beveled 18 at the end furthest from the outlet and comprise side walls 17 which diverge from the general plane of the panel. Fluid outlet 20 is positioned at about the center of the panel and at the convergence of channels 16. Fluid outlet 20 is molded into the polymeric sheet such that there is a generally clear passage for fluid flow through the channels to outlet passageway 21 of outlet nipple 22. Tube 24 engages exterior surface 23 of outlet nipple 22 for transmittal of fluid flow therethrough as desired, which is depicted as bucket 25.

FIG. 2 particularly illustrates the relative positioning of the fluid collection and fluid retention zones when the ceiling panel is generally horizontally positioned. Therein can be seen that the panel is generally bowed to a low point where the outlet is positioned, with the general plane or planes of fluid retention zone A—A of the fluid impermeable surface being upwardly positioned from outlet 20 and the general plane or planes of fluid collection zone B—B being upwardly positioned of the plane or planes of retention zone A—A. The arrangement of the fluid directing channels 16 is such as to provide continuity of flow from collection zone B—B to retention zone A—A of fluid, and provide rigidity to the panel, particularly when fluid is contained thereon.

FIGS. 3-5 particularly illustrate fluid outlet 20, molded as a contiguous element in a generally fluid impermeable layer of the panel. The top plan view presented in FIG. 3 depicts the convergence of four fluid directing channels 16 to outlet passage 21, providing relatively unrestricted but directed flow from the generally impermeable layer of the panel. In FIG. 4, a sectional view of the outlet area of the panel, depicts a contiguous positioning of channel base 19 relative to outlet upper surface 26 to provide relatively unrestricted fluid flow from fluid directing channels 16 over outlet upper surface 26 into outlet passage 21 and through outlet nipple 22. It should be understood that outlet upper surface 26 can be at a different level than channel base 19 and that nipple exterior surface may be ridged or otherwise surfaced for improved tube attachment. It should also be understood that such outlet need not be molded into the generally fluid impermeable layer but can be a separate assembly otherwise joined to the panel.

Figure 7:
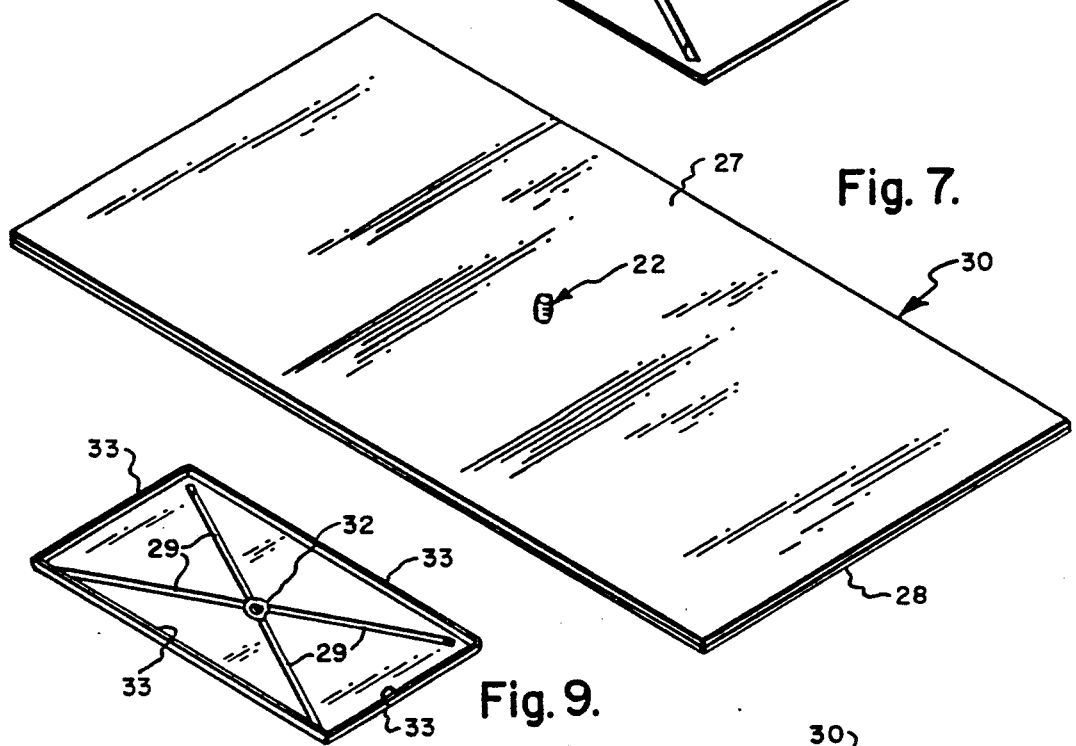
FIG. 7 is a bottom perspective view of the ceiling panel of FIG. 6.
Figure 8:
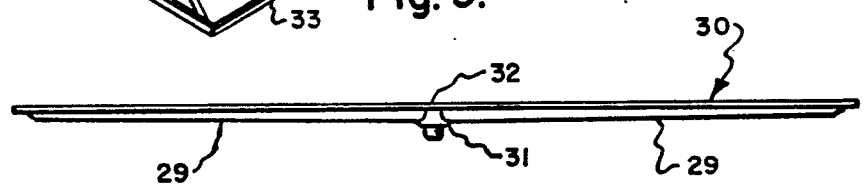
FIG. 8 is a side plan view of the ceiling panel of FIG. 6.

FIGS. 6–8 present views of a composite ceiling panel 30 of the invention comprising a conventional sound absorbing ceiling material formed into a lower layer 27 and a fluid impermeable material formed into an upper layer 28. The upper layer comprises channels 29 formed therein which extend into the conventional ceiling panel material of lower layer 27. It should be understood that in such embodiment outlet nipple 31 of fluid outlet 32 extends from the impermeable upper layer 28 through the sound absorbing material and typically is longer than when the impermeable layer is the lower layer. It should be understood that the ceiling arrangement may comprise a polymeric sheet panel as illustrated in FIGS. 1-5, installed above a conventional ceiling panel through which an opening has been formed to accept the outlet nipple.

Figure 9:
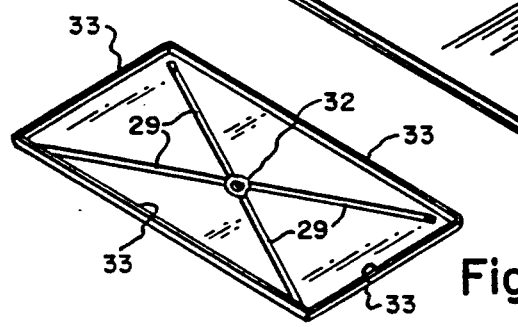
FIG. 9 is a top perspective view of an alternate ceiling panel of the invention.

FIG. 9 illustrates an alternate embodiment of the ceiling panel of FIGS. 1-5, wherein the edges of the polymeric sheet have been provided with a ridge 33. Such ridge can provide additional rigidity to the panel and act to resist fluid leakage over the edge of the panel in the event of a blockage in flow from the outlet nipple.

We claim:

1. A suspended ceiling arrangement comprising a ceiling panel, said panel comprising a generally fluid impermeable layer and a ceiling support surface; said ceiling support surface comprised at a periphery of said panel for engagement with a ceiling panel support grid in generally horizontal arrangement; said fluid impermeable layer having a fluid collection zone and a fluid retention zone; said fluid collection zone being in a plane above said fluid retention zone when said ceiling support surface is engaged with said ceiling panel support grid; said fluid retention zone comprising a fluid outlet; and, means to direct fluid, flowing by gravity, toward said fluid outlet.

2. An arrangement of claim 1 wherein said generally fluid impermeable layer comprises an exterior surface of the panel.

3. An arrangement of claim 1 wherein said means to direct fluid extend from said fluid collection zone into said fluid retention zone.

4. An arrangement of claim 1 wherein said means to direct fluid, comprise channel means.

5. An arrangement of claim 1 wherein said ceiling panel comprises a polymeric, fluid impermeable surface comprising molded channels.

6. An arrangement of claim 1 comprising a ceiling panel wherein said fluid retention zone is centrally positioned in a polymeric, rectangular panel and said fluid outlet is positioned at the lowest extending point of the fluid retention zone.

7. An arrangement of claim 6 comprising a ceiling panel having channels molded into said polymeric rectangular panel, arranged to extend from about the corners of the rectangle to a centrally located fluid outlet in said retention zone.

8. An arrangement of claim 6 wherein said polymeric rectangular panel comprises a ridge about the periphery of said panel.

9. An arrangement of claim 2 wherein said generally fluid impermeable layer comprises an upper surface of a ceiling panel.

10. An arrangement of claim 9 comprising a generally fluid permeable layer below said generally fluid impermeable layer.

11. A rectangular ceiling panel comprising a generally fluid impermeable layer and a ceiling support surface; said ceiling support surface being arranged at a periphery of said panel for engagement with a ceiling panel support grid in generally horizontal arrangement; said fluid impermeable layer comprising an upper surface of said panel and having a fluid collection zone and a fluid retention zone; said fluid collection zone being in a plane above said fluid retention zone when said ceiling support surface is engaged with said ceiling panel support grid; said fluid retention zone comprising a fluid outlet; said generally fluid impermeable layer comprising channels, arranged to extend from about the corners of the rectangular panel to a centrally located fluid outlet in said retention zone.

* * * * *